(12) United States Patent
Park

(10) Patent No.: US 11,767,231 B2
(45) Date of Patent: Sep. 26, 2023

(54) REFRIGERATOR THAT GUIDES RESIDUAL WATER FROM A FILTER MOUNTING PORTION TO ANOTHER FILTER MOUNTING PORTION

(71) Applicant: SAMSUNG ELECTRONICS CO., LTD., Suwon-si (KR)

(72) Inventor: Sangmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 16/951,025

(22) Filed: Nov. 18, 2020

(65) Prior Publication Data

US 2021/0147253 A1    May 20, 2021

(30) Foreign Application Priority Data

Nov. 19, 2019 (KR) ........................ 10-2019-0148619

(51) Int. Cl.
    *C02F 1/00*    (2023.01)
    *F25D 23/12*    (2006.01)

(52) U.S. Cl.
    CPC ............ *C02F 1/003* (2013.01); *F25D 23/126* (2013.01); *C02F 2307/10* (2013.01); *C02F 2307/12* (2013.01); *F25D 2323/121* (2013.01)

(58) Field of Classification Search
    CPC .. C02F 1/003; C02F 2307/10; C02F 2307/12; F25D 23/126; F25D 2323/121; F25D 21/14
    USPC ........................................................... 62/318
    See application file for complete search history.

(56) References Cited

U.S. PATENT DOCUMENTS

| 10,168,094 B2 | 1/2019 | Tae et al. |
| 10,266,437 B2 | 4/2019 | Yoon et al. |
| 2017/0350641 A1 | 12/2017 | Park |
| 2019/0151784 A1 | 5/2019 | You et al. |

FOREIGN PATENT DOCUMENTS

| CN | 204543728 U | 8/2015 |
| CN | 204897456 U | 12/2015 |
| CN | 110357328 A | 10/2019 |
| EP | 2 770 280 A2 | 8/2014 |
| EP | 2 770 280 A3 | 4/2015 |

(Continued)

OTHER PUBLICATIONS

International Search Report dated Feb. 10, 2021, in corresponding International Patent Application No. PCT/KR2020/015756.

(Continued)

*Primary Examiner* — Steve S Tanenbaum
(74) *Attorney, Agent, or Firm* — STAAS & HALSEY LLP

(57) ABSTRACT

Disclosed herein is a refrigerator, and more particularly, to a refrigerator including a water supply system. The refrigerator includes a main body including a storage compartment, and a water supply assembly disposed in the storage compartment. The water supply assembly includes a first filter mounting portion provided to allow a first filter to be mounted thereon, and a second filter mounting portion provided to allow a second filter to be mounted thereon, and including a residual water guide configured to guide residual water in the second filter mounting portion to the first filter mounting portion.

15 Claims, 11 Drawing Sheets

(56) References Cited

FOREIGN PATENT DOCUMENTS

| | | |
|---|---|---|
| EP | 3 222 337 A1 | 9/2017 |
| JP | 2004-167404 | 6/2004 |
| JP | 2007-289888 | 11/2007 |
| KR | 20-0241735 | 7/2001 |
| KR | 10-2007-0009937 A | 1/2007 |
| KR | 20-0439241 Y1 | 3/2008 |
| KR | 200439241 * | 3/2008 |
| KR | 20-0441065 Y1 | 7/2008 |
| KR | 10-1251654 | 4/2013 |
| KR | 20-0475977 | 1/2015 |
| KR | 10-2015-0076972 A | 7/2015 |
| KR | 10-2016-0055741 A | 5/2016 |
| KR | 10-2018-0007663 A | 1/2018 |

OTHER PUBLICATIONS

European Search Report dated Aug. 16, 2022, issued in European Application No. EP 20 89 1239.

* cited by examiner

REFRIGERATOR THAT GUIDES RESIDUAL WATER FROM A FILTER MOUNTING PORTION TO ANOTHER FILTER MOUNTING PORTION

CROSS-REFERENCE TO RELATED APPLICATION(S)

This application is based on and claims priority under 35 U.S.C. § 119 to Korean Patent Application No. 10-2019-0148619, filed on Nov. 19, 2019, in the Korean Intellectual Property Office, the disclosure of which is incorporated by reference herein in its entirety.

BACKGROUND

1. Field

The disclosure relates to a refrigerator, and more particularly, to a refrigerator including a water supply system.

2. Description of Related Art

In general, a refrigerator is a device that stores food fresh at a low temperature by supplying low temperature cold air to a storage compartment in which food is stored.

The refrigerator may be classified according to the shape of a storage compartment and a door, and thus the refrigerator may be classified into a top mounted freezer (TMF) type in which a storage compartment is divided up and down by a horizontal partition to form a freezing compartment on the upper side and a refrigerating compartment on the lower side, and a bottom mounted freezer (BMF) type refrigerator in which a refrigerating compartment is formed in the upper side and a freezing compartment is formed in the lower side. Further, the refrigerator may include a side by side (SBS) type refrigerator in which a storage compartment is partitioned left and right by a vertical partition, and a freezing compartment is formed on one side, and a refrigerating compartment is formed on the other side, and a French door refrigerator (FDR) in which a storage compartment is divided up and down by a horizontal partition, a refrigerating compartment is formed on the upper side, a freezing compartment is formed on the lower side, and the refrigerating compartment on the upper side is opened and closed by a pair of doors.

The refrigerator may include an ice maker configured to manufacture ice, a dispenser provided to extract water from the front of the door without opening the door, and a water supply system configured to supply water to the ice maker and/or the dispenser.

The water supply system may be provided with a water supply assembly including a filter, a water tank, and a valve. The water supply system may purify water supplied from an external water supply source, and supply the purified water to the ice maker, the water tank and/or the dispenser through the valve.

SUMMARY

Therefore, it is an aspect of the disclosure to provide a refrigerator capable of efficiently using a space of a storage compartment.

It is another aspect of the disclosure to provide a refrigerator including a water supply assembly having improved usability.

It is another aspect of the disclosure to provide a refrigerator capable of effectively managing water that may be generated upon replacing a filter.

It is another aspect of the disclosure to provide a refrigerator capable of minimizing a decrease in a flow rate of a water supply assembly.

Additional aspects of the disclosure will be set forth in part in the description which follows and, in part, will be obvious from the description, or may be learned by practice of the disclosure.

In accordance with an aspect of the disclosure, a refrigerator includes a main body including a storage compartment, and a water supply assembly disposed in the storage compartment. The water supply assembly includes a first filter mounting portion provided to allow a first filter to be mounted thereon, and a second filter mounting portion provided to allow a second filter to be mounted thereon, and including a residual water guide configured to guide residual water in the second filter mounting portion to the first filter mounting portion.

The water supply assembly may further include a ventilation hole formed between the first filter mounting portion and the second filter mounting portion.

The ventilation hole may extend along a direction in which the second filter is separable from the second filter mounting portion.

The residual water guide may be a first residual water guide, and the water supply assembly may further include a third filter mounting portion provided to allow a third filter to be mounted thereon, located above the second filter mounting portion, and including a second residual water guide configured to guide residual water in the third filter mounting portion to the second filter mounting portion.

The water supply assembly may be configured to guide water supplied from a water supply source to the second filter and the third filter in parallel, and configured to guide water, which passes through the second filter and the third filter, to the first filter.

The refrigerator may further include an ice maker, and the water supply assembly may further include a water tank, and a valve configured to distribute water, which passes through the first filter, to the water tank or the ice maker.

The water tank may include a water tank inlet connected to the valve, a water tank outlet configured to discharge water that flows from the water tank inlet, and a water tank pipe connected to the water tank inlet and provided to extend toward a side opposite to a side on which the water tank outlet is disposed.

The first filter mounting portion and the second filter mounting portion may be configured so that, when the first filter is mounted on the first filter mounting portion and the second filter is mounted on the second filter mounting portion, the first filter and the second filter may longitudinally extend in a same direction, and the water tank may be provided to extend in a direction perpendicular to the direction in which the first filter and the second filter longitudinally extend.

The water supply assembly may further include a residual water tray disposed under the first filter mounting portion.

The water supply assembly may further include a first filter separating portion through which the first filter is passable to be mounted on the first filter mounting portion and, after being mounted on the first filter mounting portion, is passable to be separated from the water supply assembly, and the residual water tray may be configured to be withdrawn from the water supply assembly through the first filter separating portion.

The residual water tray may be mountable in the water supply assembly, and the water supply assembly may further include a tray guide configured to guide a movement of the residual water tray while the residual water tray is being mounted in the water supply assembly.

The residual water guide may extend from the second filter mounting portion toward the first filter mounting portion.

The second filter mounting portion may include a guide inclined portion formed to be inclined downward in a direction that the second filter is separable from the second filter mounting portion.

The refrigerator may further include a storage box disposed inside the main body, and the water supply assembly may be formed to extend along one side and a rear side of the storage box.

The water supply assembly may be configured to allow a portion of the first filter and a portion of the second filter to be exposed from the storage box when the storage compartment is opened.

The water supply assembly may further include a head to which the second filter is coupleable while mounted on the second filter mounting portion, and from which the second filter is separable, and the residual water may be generated from the second filter or the head upon the second filter being separated from the head.

In accordance with another aspect of the disclosure, a refrigerator includes a main body including a storage compartment, and a water supply assembly disposed in the storage compartment. The water supply assembly includes a first head to which a first filter is coupleable and from which the first filter is separable, a first filter mounting portion provided to allow the first filter to be mounted thereon so as to be coupled to the first head, a second head to which a second filter is coupleable and from which the second filter is separable, and a second filter mounting portion provided to allow the second filter to be mounted thereon so as to be coupled to the second head, wherein the second filter mounting portion comprises a guide inclined portion formed to be inclined downward in a direction that the second filter is separable from the second filter mounting portion, so as to guide residual water in the second head, generated when the second filter is separated from the second head, to the first filter mounting portion.

The second filter mounting portion may include a residual water guide provided to extend toward the first filter mounting portion while extending in the direction that the second filter is separable from the second filter mounting portion, to guide residual water in the second filter mounting portion generated when the second filter is separated from the second header, to the first filter mounting portion.

The water supply assembly may include a residual water tray disposed under the first filter mounting portion.

The water supply assembly may further include a ventilation hole formed between the first filter mounting portion and the second filter mounting portion.

In accordance with another aspect of the disclosure, a refrigerator includes a main body including a storage compartment, and a water supply assembly disposed in the storage compartment. The water supply assembly includes a first filter mounting portion provided to allow a first filter to be mounted thereon, a second filter mounting portion provided to allow a second filter to be mounted thereon, and a third filter mounting portion provided to allow a third filter to be mounted thereon. The water supply assembly is configured to guide water supplied from a water supply source to the second filter and the third filter in parallel, and configured to guide water, which passes through the second filter and the third filter, to the first filter.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
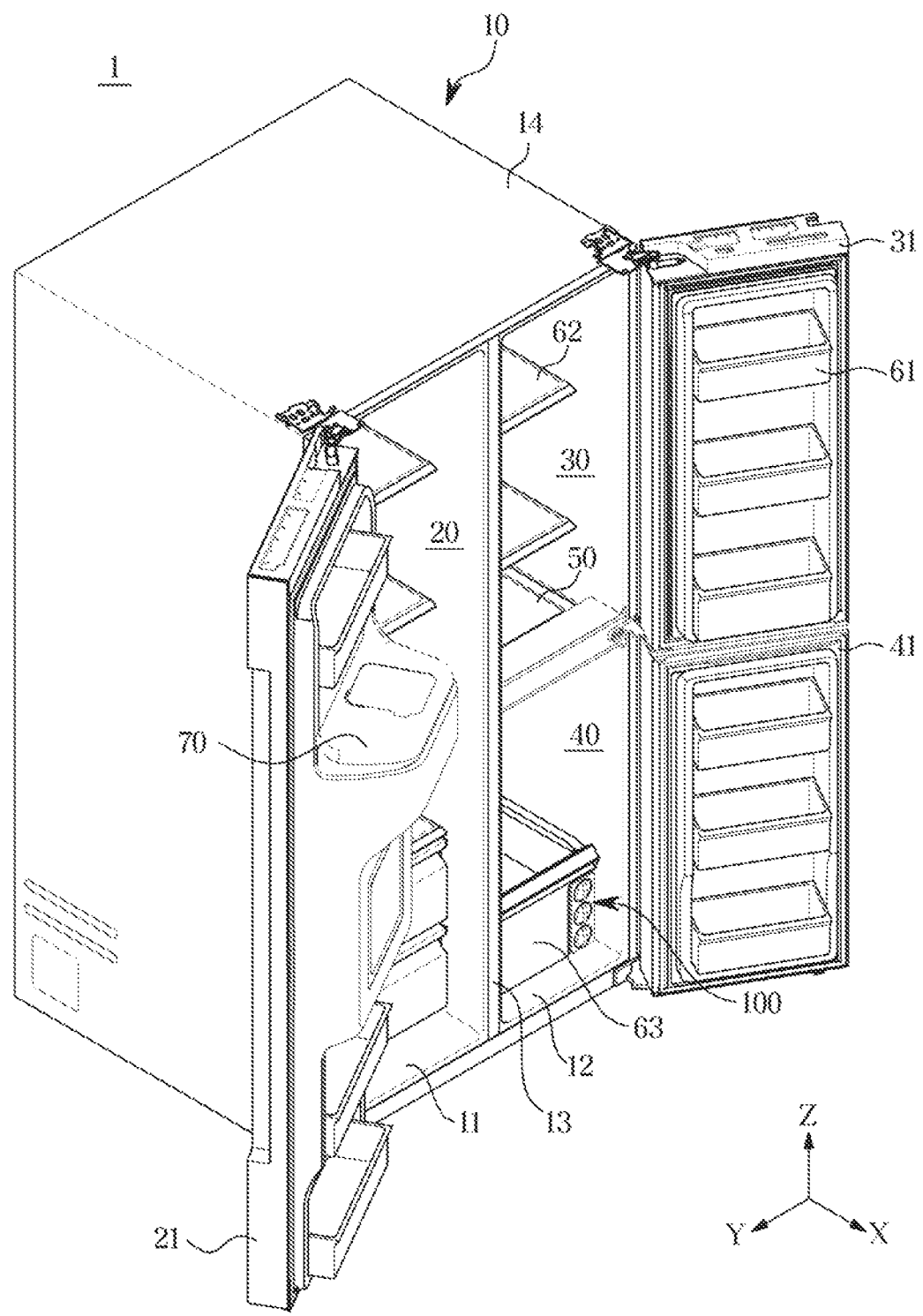
FIG. 1 is a view illustrating a refrigerator according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The terms "front", "rear", "upper", "lower", "left", "right" and the like used below are defined based on the drawings, and the shape and position of each component are not limited by this term.

Hereinafter, embodiments of the disclosure will be described in detail with reference to the accompanying drawings.

FIG. 1 is a view illustrating a refrigerator according to an embodiment of the disclosure.

Referring to FIG. 1, a refrigerator 1 according to an embodiment of the disclosure may include a main body 10, a plurality of storage compartments 20, 30, and 40 formed inside the main body 10, and a plurality of doors 21, 31 and 41 configured to open and close the plurality of storage compartments 20, 30, and 40.

The main body 10 may include a plurality of inner cases 11 and 12 and an outer case 14 disposed on the outside of the plurality of inner cases to form an exterior of the refrigerator 1. Between the plurality of inner cases 11, and 12 and the outer case 14, an insulating material (not shown) may be foamed and filled to prevent cold air of the plurality of storage compartments 20, 30, and 40 from leaking to the outside of the refrigerator 1.

The plurality of inner cases 11 and 12 may include a first inner case 11 and a second inner case 12 adjacent in a left and right direction Y of the refrigerator 1. The first inner case 11 may be disposed on the left side of a partition wall 13 in the left and right direction Y of the refrigerator 1, and the second inner case 12 may be disposed on the right side of the partition wall 13 in the left and right direction Y of the refrigerator 1. Between the first inner case 11 and the second inner case 12, an insulating material (not shown) may be foamed and filled to prevent the heat exchange between the freezing compartment 20 and a plurality of the refrigerating compartment 30 and 40.

The plurality of storage compartments 20, 30, and 40 may include the freezing compartment 20 provided in the inside of the main body 10. The plurality of storage compartments 20, 30, and 40 may include the freezing compartment 20 provided in the inside of the first inner case 11.

The plurality of storage compartments 20, 30, and 40 may further include the plurality of refrigerating compartments 30 and 40 provided in the inside of the main body 10 so as to be adjacent to the freezing compartment 20 in the left and right direction Y of the refrigerator 1. Particularly, the plurality of storage compartments 20, 30, and 40 may further include the plurality of refrigerating compartments 30 and 40 provided in the inside of the second inner case 12. The plurality of refrigerating compartments 30 and 40 may include a first refrigerating compartment 30 and a second refrigerating compartment 40. The first refrigerating compartment 30 and the second refrigerating compartment 40 may be disposed adjacent to each other in an up and down direction Z of the refrigerator. The first refrigerating compartment 30 and the second refrigerating compartment 40 may be divided in the up and down direction Z of the refrigerator 1 by a divider 50 so as to communicate with each other. Particularly, the first refrigerating compartment 30 may be disposed above the divider 50 in the up and down direction Z of the refrigerator 1, and the second refrigerating compartment 40 may be disposed below the divider 50 in the up and down direction Z of the refrigerator 1.

The plurality of storage compartments 20, 30, and 40 may include an open front surface. A plurality of shelves 62 and/or a storage box 63 may be provided in the plurality of storage compartments 20, 30, and 40 to store food.

The storage box 63 may be configured to place and store food therein. The storage box 63 may be located in the second refrigerating compartment 40. The storage box 63 may be withdrawn from the second refrigerating compartment 40 or may be inserted into the second refrigerating compartment 40. The storage box 63 may be configured to be movable in a front and rear direction X of the refrigerator 1. The storage box 63 may slide with respect to the second refrigerating compartment 40.

The storage box 63 may include an assembly receiver 64 formed in a shape and size corresponding to a water supply assembly 100. The assembly receiver 64 may be recessed in one side and a rear side of the storage box 63.

The storage box 63 may include a plurality of holes 65 formed on at least one surface facing the water supply assembly 100 upon being mounted to the second refrigerating compartment 40 together with the water supply assembly 100. The plurality of holes 65 may be configured to transmit cold air from the second refrigerating compartment 40 to the water supply assembly 100.

The plurality of doors 21, 31, and 41 may be rotatably installed on the main body 10 to open and close the open front surfaces of the plurality of storage compartments 20, 30, and 40. The plurality of doors 21, 31 and 41 may include a freezing compartment door 21 rotatably installed on the main body 10 to open and close the freezing compartment 20, a first refrigerating compartment door 31 rotatably installed on the main body 10 to open and close the first refrigerating compartment 30, and a second refrigerating compartment door 41 rotatably installed on the main body 10 to open and close the second refrigerating compartment 40.

A plurality of door guards 61 may be provided on a rear surface of the plurality of doors 21, 31, and 41 to store food or the like.

A dispenser 70 may be provided on at least one of the plurality of doors 21, 31, and 41 to allow a user to take out water or ice from the outside. Particularly, the dispenser 70 may be provided on the freezing compartment door 21.

The refrigerator 1 may further include a cold air supply device configured to supply cold air to the plurality of storage compartments 20, 30, and 40. The cold air supply device may include a compressor, a condenser, an expansion valve, and an evaporator. The compressor configured to compress a refrigerant and the condenser configured to condense the compressed refrigerant may be installed in a machine room provided below the rear of the plurality of storage compartments 20, 30, and 40.

The water supply assembly 100 may be disposed in the storage compartments 20, 30, and 40. Particularly, the water supply assembly 100 may be disposed in the second refrigerating compartment 40. However, the location of the water supply assembly 100 is not limited thereto.

Figure 2:
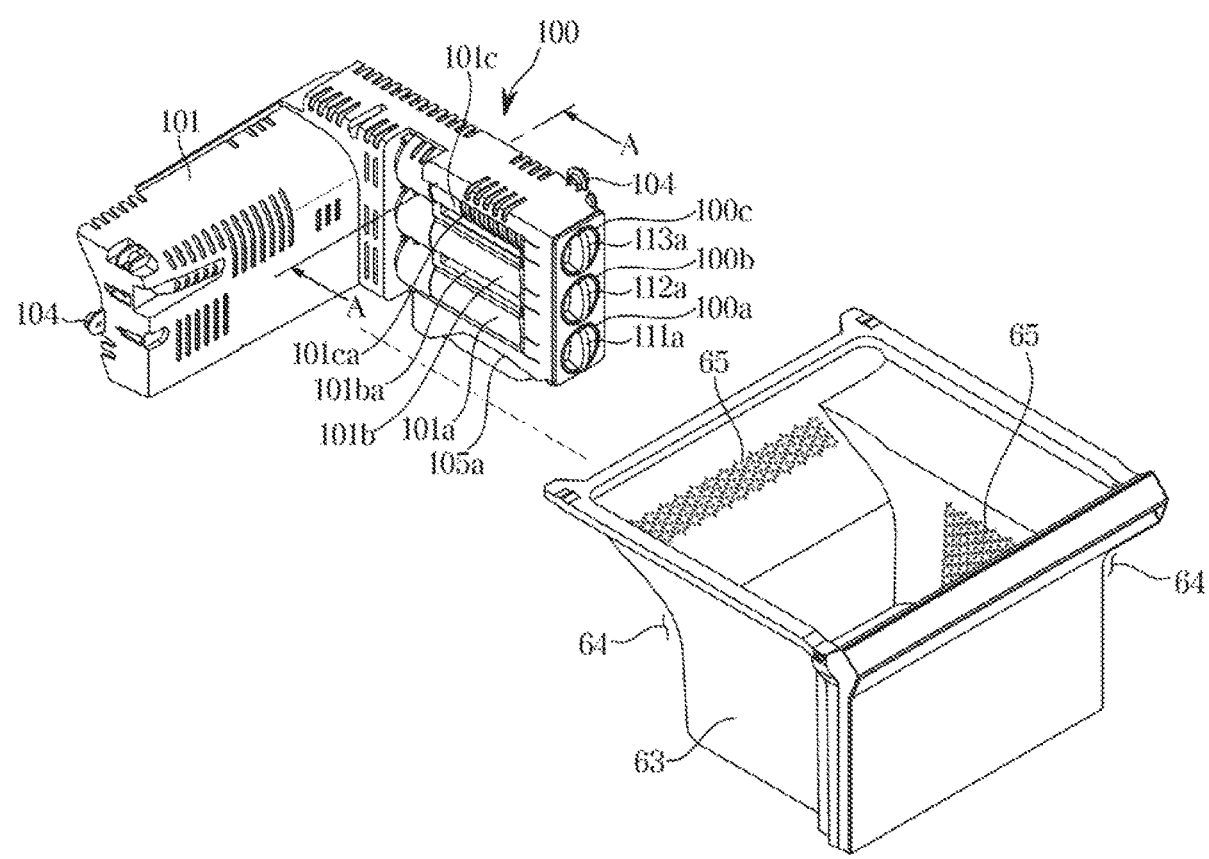
FIG. 2 is a view illustrating a water supply assembly and a storage box shown in FIG. 1 separated from each other.
Figure 3:
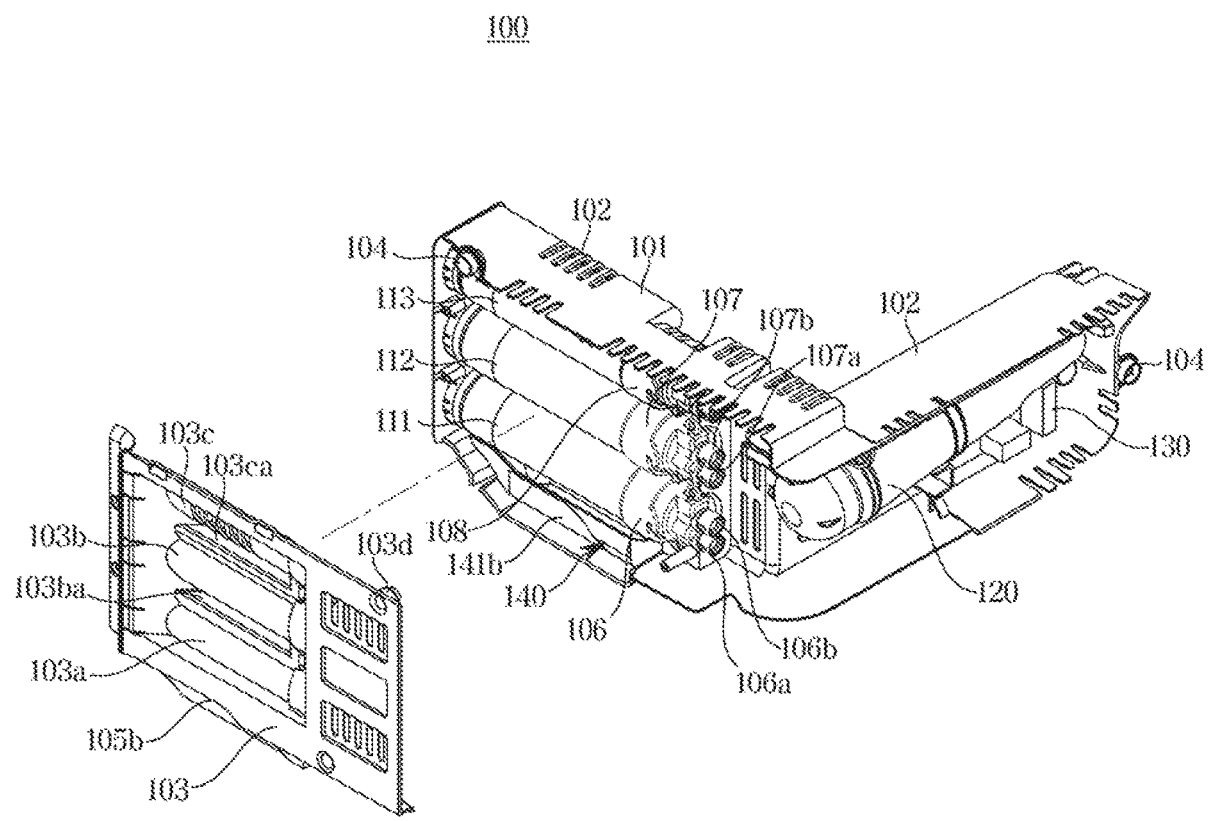
FIG. 3 is a view illustrating an inside of the water supply assembly shown in FIG. 2.
Figure 4:
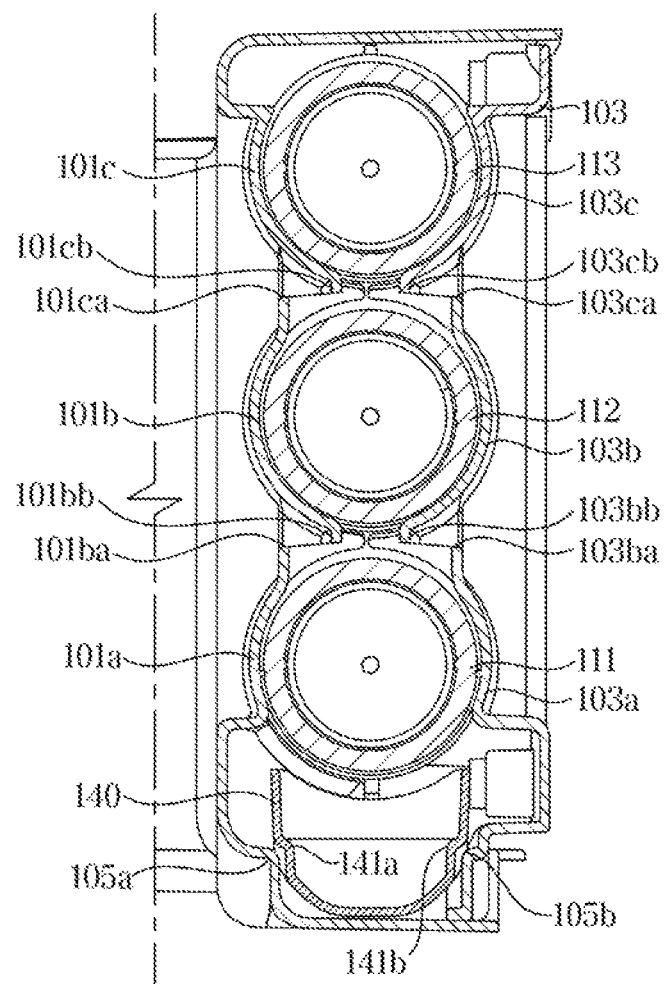
FIG. 4 is a sectional view taken along a line A-A' of FIG. 2.
Figure 5:
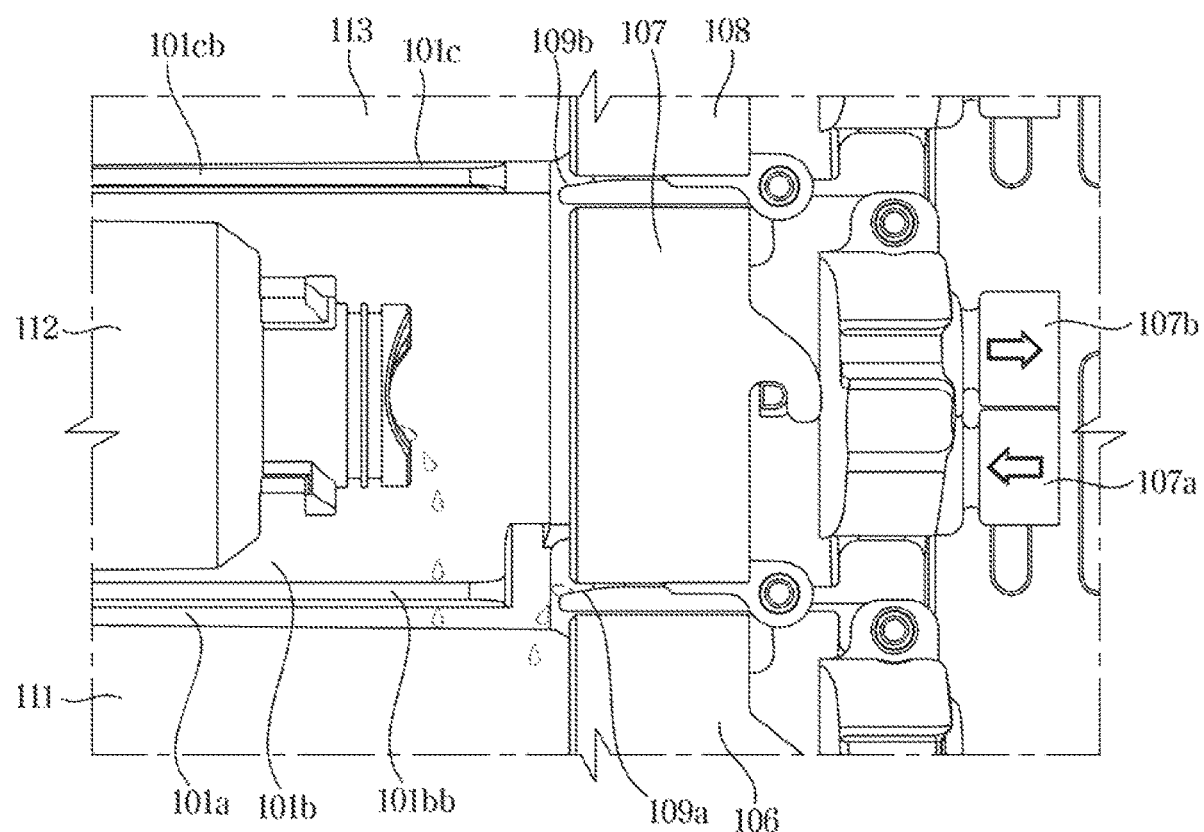
FIG. 5 is an enlarged view illustrating a side surface of a second filter separated from a second head shown in FIG. 3.
Figure 6:
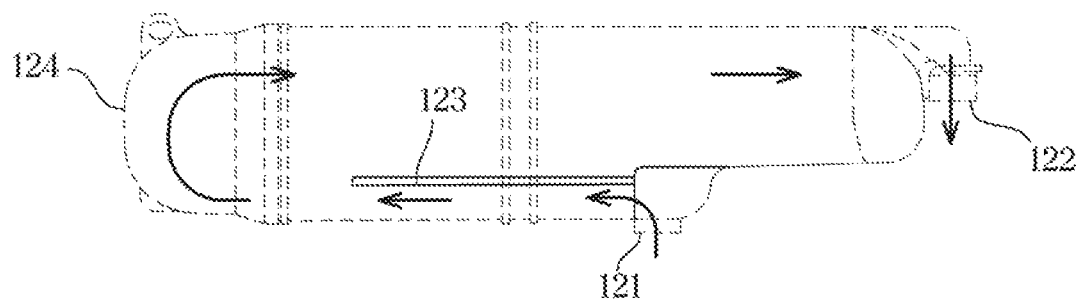
FIG. 6 is a view illustrating an inside of a water tank shown in FIG. 3.

FIG. 2 is a view illustrating a water supply assembly and a storage box shown in FIG. 1 separated from each other. FIG. 3 is a view illustrating an inside of the water supply assembly shown in FIG. 2. FIG. 4 is a sectional view taken along a line A-A' of FIG. 2. FIG. 5 is an enlarged view illustrating a side surface of a second filter separated from a second head shown in FIG. 3. FIG. 6 is a view illustrating an inside of a water tank shown in FIG. 3.

Referring to FIGS. 2 and 3, the water supply assembly 100 may include a plurality of filters 111, 112, and 113 configured to purify the water supplied from an external water supply source 90 (refer to FIG. 10), a water tank 120 configured to store some of water purified by the plurality of filters 111, 112, and 113, and a valve 130 configured to distribute the water purified by the plurality of filters 111, 112, and 113 to the dispenser 70, and an ice maker 80. The plurality of filters 111, 112, and 113, the water tank 120, and the valve 130 may be accommodated in a case 101. As the plurality of filters 111, 112, and 113, the water tank 120, and the valve 130 are accommodated in the case 101 and then modularized, the water supply assembly 100 may be provided compactly, and thus it is possible to minimize a space occupied by the water assembly in the storage compartments 20, 30, and 40.

The case 101 may extend along one surface and the rear surface of the storage box 63. The case 101 may be located on the right and rear sides of the storage box 63. The case 101 may have the letter "L" shape. As the case 101 is formed to correspond to the assembly receiver 64 of the storage box 63, it is possible to minimize the space occupied by the water supply assembly 100 according to an embodiment of the disclosure in the storage compartments 20, 30, and 40.

The case 101 may include a plurality of holes 102 formed to communicate with the second storage compartment 40. The cold air of the second storage compartment 40 may flow into the case 101 through the plurality of holes 102.

The case 101 may include a case fixer 104 to be fixed to the main body 10 through a fastening member (not shown). The case fixer 104 may be provided to face one side of the inner case 12 of the main body 10 and/or the rear surface of the inner case 12 of the main body 10.

One surface of the case 101 may be open. A cover 103 may be detachably mounted on an open side of the case 101. The cover 103 may include a cover mounting portion 103d to be coupled to the case 101 through a fastening member (not shown). Alternatively, the case 101 and the cover 103 may be integrally formed with each other.

Referring to FIG. 4, in response to mounting the cover 103 to the case 101, a first case portion 101a of the case 101 and a first cover portion 103a of the cover 103 may form a first filter mounting portion 101a and 103a. The first filter mounting portions 101a and 103a may be formed to allow a first filter 111 to be mounted thereto. The first filter mounting portions 101a and 103a may be provided in a shape and size corresponding to the first filter 111.

A first head 106 to which the first filter 111 is coupled may be provided at one end of the first filter mounting portions 101a and 103a. The first filter 111 may be detachably coupled to the first head 106. The first head 106 may include a first head inlet 106a and a first head outlet 106b. In response to mounting the first filter 111 to the first head 106, water may flow into the first filter 111 through the first head inlet 106a, and water, which is purified by the first filter 111, may be discharged from the first filter 111 through the first head outlet 106b.

Referring to FIGS. 4 and 5, a second case portion 101b of the case 101 and a second cover portion 103b of the case 103 may form a second mounting portion 101b and 103b in response to mounting the cover 103 to the case 101. The second filter mounting portions 101b and 103b may be formed to allow the second filter 112 to be mounted thereto. The second filter mounting portions 101b and 103b may be provided in a shape and size corresponding to the second filter 112. The second filter mounting portions 101b and 103b may be positioned above the first filter mounting portions 101a and 103a.

A second head 107 to which the second filter 112 is coupled may be provided at one end of the second filter mounting portions 101b and 103b. The second filter 112 may be detachably coupled to the second head 107. The second head 107 may include a second head inlet 107a and a second head outlet 107b. In response to mounting the second filter 112 to the second head 107, water may flow into the second filter 112 through the second head inlet 107a, and water, which is purified by the second filter 112, may be discharged from the second filter 112 through the second head outlet 107b.

First ventilation holes 101ba and 103ba may be formed between the first filter mounting portions 101a and 103a and the second filter mounting portions 101b and 103b. The first ventilation holes 101ba and 103ba may include a first a (1a) ventilation hole 101ba formed between the first case portion 101a and the second case portion 101b, and a first b (1b) ventilation hole 103ba formed between the first cover portion 103a and the second cover portion 103b.

The first ventilation holes 101ba and 103ba are formed to allow cold air from the second refrigerating compartment 40 to flow into the case 101. Water on an outer surface of the first filter 111 may be dried by the first ventilation holes 101ba and 103ba. The first ventilation holes 101ba and 103ba may extend along a direction in which the second filter 112 is separated. Accordingly, residual water, which is generated upon separating the second filter 112, may be dried by the first ventilation holes 101ba and 103ba.

The second filter mounting portions 101b and 103b may include first residual water guides 101bb and 103bb. The first residual water guides 101bb and 103bb may include a first a (1a) residual water guide 101bb formed in the second case portion 101b and a first b (1b) residual water guide 103bb formed in the second cover portion 103b. The first residual water guides 101bb and 103bb may guide residual water to the first filter mounting portions 101a and 103a. The first residual water guides 101bb and 103bb may extend toward the first filter mounting portions 101a and 103a. The first residual water guides 101bb and 103bb may extend along the direction in which the second filter 112 is separated.

The first residual water guides 101bb and 103bb may guide residual water, which is generated in the second filter 112 and/or the second head 107 upon separating the second filter 112 from the second head 107 and then remains in the second filter mounting portion 101b and 103b, to the first filter mounting portion 101a and 103a. Residual water guided to the first filter mounting portion 101a and 103a may be directly collected in a residual water tray 140 or may flow down along the outer surface of the first filter and then collected in the residual water tray 140. By the configuration, the water supply assembly 100 according to an embodiment of the disclosure may prevent contamination by residual water generated upon replacing the second filter 112 and maintain a clean state.

The second filter mounting portions 101b and 103b may include a first guide inclined portion 109a formed to incline downward in the direction in which the second filter 112 is separated from the second filter mounting portions 101b and 103b. The first guide inclined portion 109a may be disposed under the second head 107. The first guide inclined portion 109a may be formed to protrude further in a direction, in which the second filter 112 is separated, than the second head 107. Residual water, which is generated in the second head 107 upon separating the second filter 112 from the second head 107, may be moved to the first filter mounting portion 101a and 103a along the first guide inclined portion 109a, and the water passing through the first filter mounting portion 101a and 103a may be collected in the residual water tray 140. By the configuration, the water supply assembly 100 according to an embodiment of the disclosure may prevent contamination by residual water generated upon separating the second filter 112 from the second head 107 and maintain a clean state.

Referring to FIGS. 4 and 5, a third case portion 101c of the case 101 and a third cover portion 103c of the case 103 may form third mounting portions 101c and 103c in response to mounting the cover 103 to the case 101. The third mounting portions 101c and 103c may be formed to allow the third filter 113 to be mounted thereto. The third mounting portions 101c and 103c may be provided in a shape and size corresponding to the third filter 113. The third mounting portions 101c and 103c may be positioned above the second filter mounting portions 101b and 103b.

A third head 108 to which the third filter 113 is coupled may be provided at one end of the third filter mounting portions 101c and 103c. Because the configuration of the third head 108 is the same as that of the second head 107, detailed descriptions are omitted.

Second ventilation holes 101ca and 103ca may be formed between the second filter mounting portions 101b and 103b and the third filter mounting portions 101c and 103c. The second ventilation holes 101ca and 103ca include a second ventilation hole 101ca formed between the second case portion 101b and the third case portion 101c, and a second ventilation hole 103ca formed between the second cover portion 103b and the third cover portion 103c.

The second ventilation holes 101ca and 103ca are formed to allow cold air from the second refrigerating compartment 40 to flow into the case 101. Water on an outer surface of the second filter 112 may be dried by the second ventilation holes 101ca and 103ca. The second ventilation holes 101ca and 103ca may extend along a direction in which the third filter 113 is separated. Accordingly, residual water, which is generated upon separating the third filter 113, may be dried by the second ventilation holes 101ca and 103ca.

The third filter mounting portions 101c and 103c may include second residual water guides 101cb and 103cb. The second residual water guides 101cb and 103cb may include a second a (2a) residual water guide 101cb formed in the third case portion 101c and a second b (2b) residual water guide 103cb formed in the third cover portion 103c. The second residual water guides 101cb and 103cb may guide residual water to the second filter mounting portions 101b and 103b. The second residual water guides 101cb and 103cb may extend toward the second filter mounting portions 101b and 103b. The second residual water guides 101cb and 103cb may extend along a direction in which the third filter 113 is separated.

The second residual water guides 101cb and 103cb may guide residual water, which is generated in the third filter 113 and/or the third head 108 upon separating the third filter 113 from the third head 108 and then remains in the third filter mounting portion 101c and 103c, to the second filter mounting portion 101b and 103b. Residual water guided to the second filter mounting portion 101b and 103b may be directly collected in the residual water tray 140 or may flow down along the outer surface of the second filter 112 and the first filter 111 and then collected in the residual water tray 140. By the configuration, the water supply assembly 100 according to an embodiment of the disclosure may prevent contamination by residual water generated upon replacing the third filter 113 and maintain a clean state.

The third filter mounting portions 101c and 103c may include a second guide inclined portion 109b formed to incline downward in the direction in which the third filter 113 is separated from the third filter mounting portions 101c and 103c. The second guide inclined portion 109b may be disposed under the third head 108. Because the configuration of the second guide inclined portion 109b is the same as that of the first guide inclined portion 109a, a detailed description will be omitted.

The plurality of filters 111, 112, and 113 include the first filter 111, the second filter 112 positioned above the first filter 111, and the third filter 112 positioned above the second filter 112. The plurality of filters 111, 112, and 113 may be disposed along the up and down direction. The first filter 111, the second filter 112, and the third filter 113 may be disposed to extend in a substantially horizontal direction. The first filter 111, the second filter 112, and the third filter 113 may all extend in the same direction.

The plurality of filters 111, 112, and 113 may be provided in such a way that at least a portion of the filters 111, 112, and 113 is exposed from one side of the storage box 63 in response to opening the second refrigerating compartment 40. A portion of the plurality of filters 111, 112, and 113 may be exposed from the right side of the storage box 63. When replacing the plurality of filters 111, 112 and 113, a user may open the second refrigerating compartment 40 and then easily separate the plurality of filters 111, 112 and 113 exposed on one side of the storage box 63, from the assembly 100.

Particularly, the first filter 111 may include a first filter handle 111a. The first filter handle 111a may be provided to be exposed through a first filter separating portion 100a upon mounting the first filter 111 to the water supply assembly 100. A user may separate the first filter 111 from the water supply assembly 100 by a motion in which the user holds, rotates and pulls the first filter handle 111a.

The second filter 112 may include a second filter handle 112a. The second filter handle 112a may be provided to be exposed through a second filter separating portion 100b upon mounting the second filter 112 to the water supply assembly 100. A user may separate the second filter 112 from the water supply assembly 100 by a motion in which the user holds, rotates and pulls the second filter handle 112a.

The third filter 113 may include a third filter handle 113a. The third filter handle 113a may be provided to be exposed through a third filter separating portion 100c upon mounting the third filter 113 to the water supply assembly 100. A user may separate the third filter 113 from the water supply assembly 100 by a motion in which the user holds, rotates and pulls the third filter handle 113a.

The water tank 120 may store water purified by the plurality of filters 111, 112, and 113.

The water tank 120 may extend in a direction substantially perpendicular to the plurality of filters 111, 112, and 113. The plurality of filters 111, 112, 113 may extend approximately along the front and rear direction from one side of the storage box 63, and the water tank 120 may extend approximately along the left and right direction from the rear surface of the storage box 63. According to this arrangement, the water supply assembly 100 according to an embodiment of the disclosure may minimize the space occupied in the storage compartments 20, 30, and 40, and thus the storage compartments 20, 30, and 40 may be efficiently used.

Referring to FIG. 6, the water tank 120 may include a water tank inlet 121 connected to the valve 130, a water tank outlet 122 connected to the dispenser 70, and a water tank pipe 123 connected to the water tank inlet 121.

The water tank pipe 123 may be configured to guide water flowing through the water tank inlet 121 to the other side opposite to one side where the water tank outlet 122 is disposed.

The valve 130 may be configured to distribute water, which is purified by passing through the plurality of filters 111, 112, and 113, to the water tank 120 or the ice maker 80. Particularly, the valve 130 may be positioned at a branch point of a flow path through which water passing through the first filter 111 flows to the water tank 120 and the ice maker 80. The valve 130 may be disposed adjacent to the water tank 120. The valve 130 may be located at the rear side of the storage box 63.

The water supply assembly 100 may include the residual water tray 140. The residual water tray 140 may be disposed under the first filter mounting portions 101a and 103a. The residual water tray 140 may collect residual water that may be generated upon separating the first filter 111 from the first head 106. The residual water tray 140 may collect residual water that may be generated upon separating the second filter 112 from the second head 107. The residual water tray 140 may collect residual water that may be generated upon separating the third filter 113 from the third head 108. By the residual water tray 140, the water supply assembly 100 may be maintained in a clean state of use.

The residual water tray 140 may be taken out of the case 101 through the first filter separating portion 100a. The residual water tray 140 may be formed to have a width smaller than a radius of the first filter 111. By this configuration, the water supply assembly 100 according to an embodiment of the disclosure may have a relatively simple configuration because the residual water tray 140 is configured to be inserted into or taken out through the first filter separating portion 100a.

The water supply assembly 100 may include tray guides 105a and 105b configured to guide a movement of the residual water tray 140 in response to mounting the residual water tray 140. The tray guides 105a and 105b may include a first tray guide 105a formed on the case 101 and a second tray guide 105b formed on the cover 103.

The residual water tray 140 may include tray alignment portions 141a and 141b formed to be guided by the tray guides 105a and 105b. The tray alignment portions 141a and 141b include a first tray alignment portion 141a guided by the first tray guide 105a and a second tray alignment portion 141b guided by the second tray guide 105b.

By this configuration, in response to being mounted to the inside of the case 101 and the cover 103, the residual water tray 140 may be guided to a position for collecting residual water that may be generated in the plurality of filters 111, 112, and 113 and/or the plurality of heads 106, 107, and 108.

Figure 7:
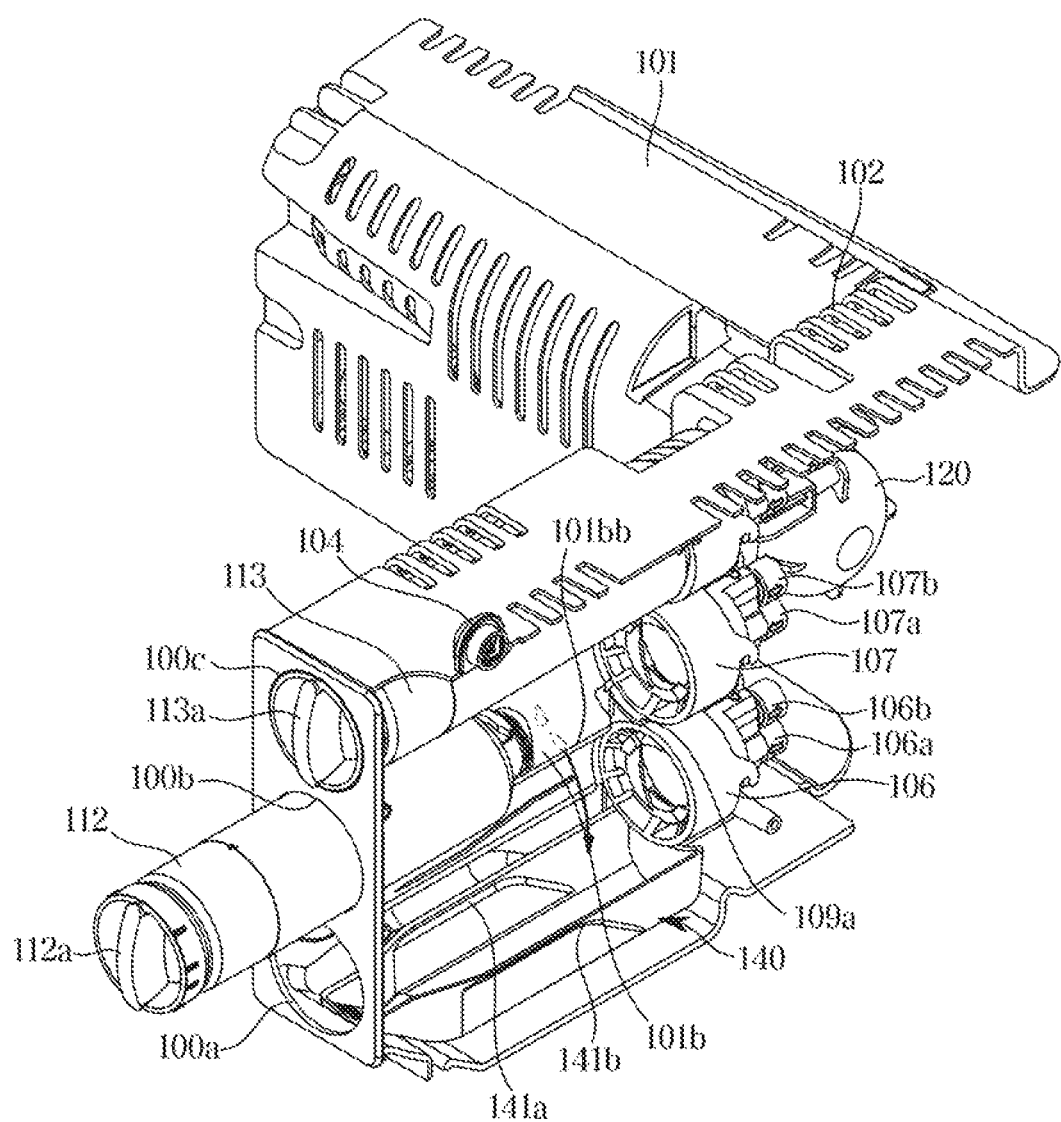
FIG. 7 is a view illustrating an internal state in which a first filter is separated and the second filter is being separated in the water supply assembly shown in FIG. 2.
Figure 8:
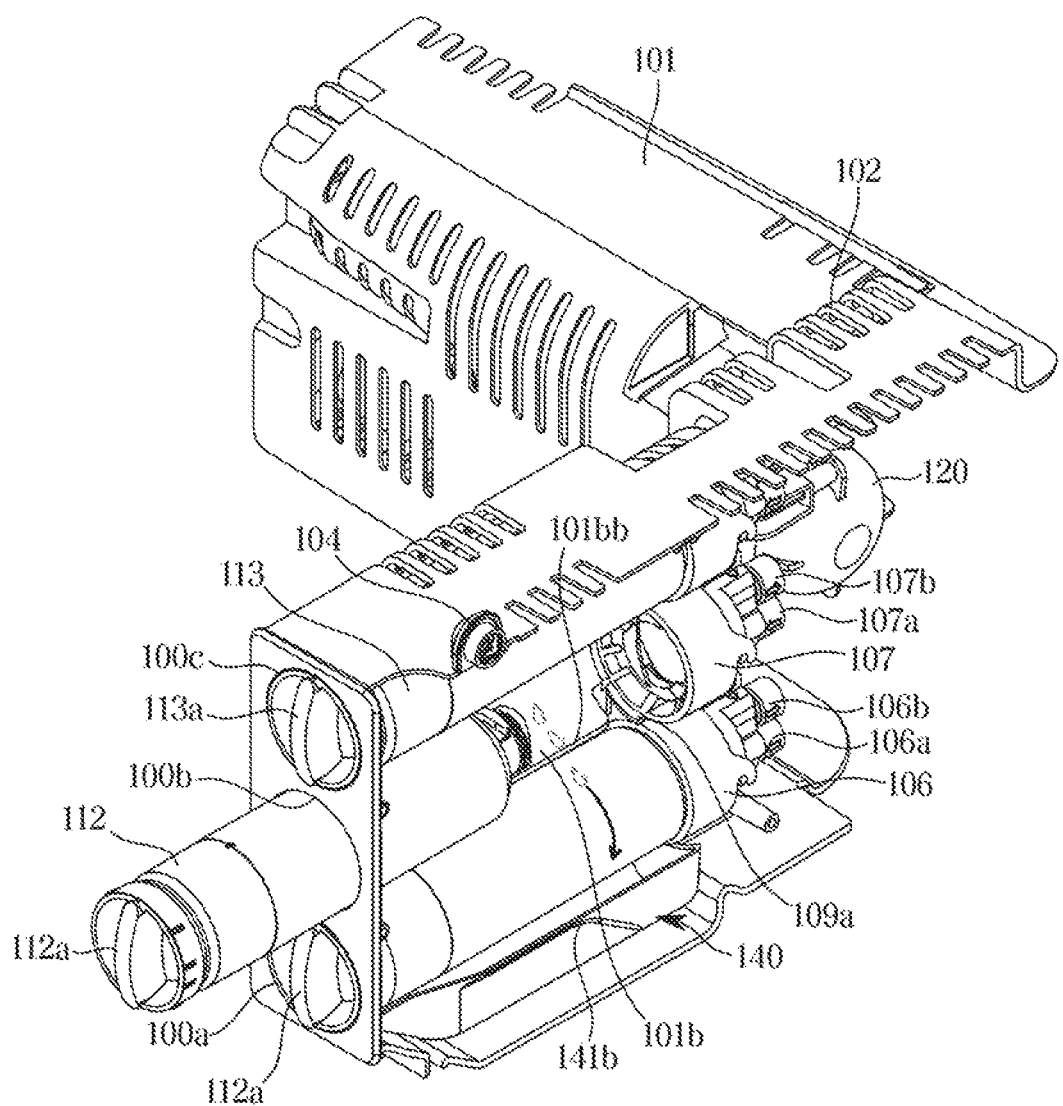
FIG. 8 is a view illustrating an internal state in which the first filter is mounted and the second filter is being separated in the water supply assembly illustrated in FIG. 2.
Figure 9:
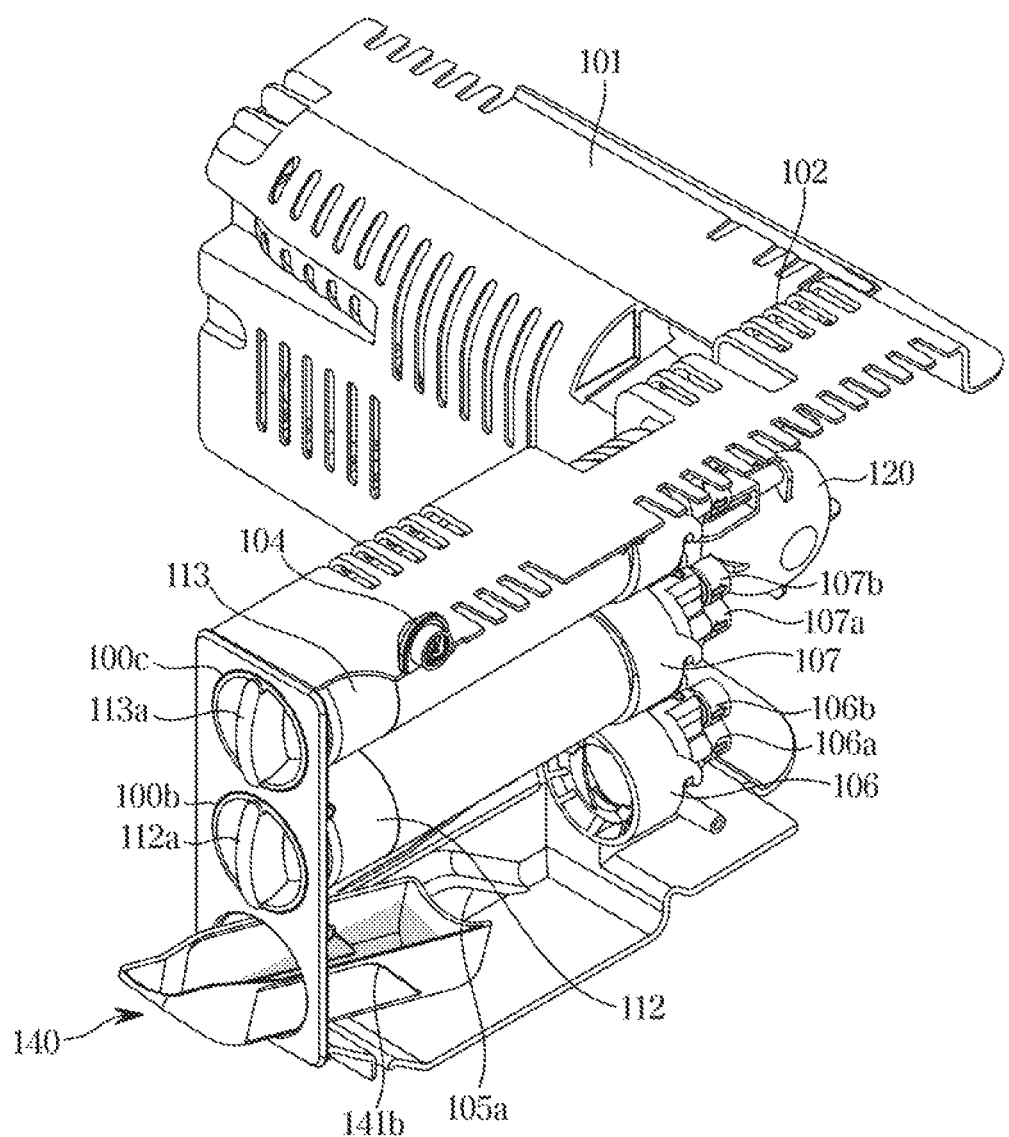
FIG. 9 is a view illustrating an inside of the water supply assembly in which a residual water tray is separated from the water supply assembly show in FIG. 2.

FIG. 7 is a view illustrating an internal state in which a first filter is separated and the second filter is being separated in the water supply assembly shown in FIG. 2. FIG. 8 is a view illustrating an internal state in which the first filter is mounted and the second filter is being separated in the water supply assembly illustrated in FIG. 2. FIG. 9 is a view illustrating an inside of the water supply assembly in which a residual water tray is separated from the water supply assembly show in FIG. 2.

An operation of the water supply assembly 100 according to an embodiment of the disclosure will be described with reference to FIGS. 7 to 9.

Referring to FIG. 7, residual water, which is generated in the second filter 112 and/or the second head 107 upon separating the second filter 112 from the second head 107 while the first filter 111 is separated from the first head 106, may pass through the first filter mounting portions 101a and 103a along the first residual water guides 101bb and 103bb, and then collected in the residual water tray 140. Particularly, the residual water, which is generated from the second header 107 in the process of removing the second filter 112, may be directly guided to the residual water tray 140 by the first residual water guides 101bb and 103bb. Further, referring to FIGS. 5 and 7, residual water generated in the second head 107 may be directly guided to the residual water tray 140 by the first guide inclined portion 109a.

Referring to FIG. 8, residual water, which is generated in the second filter 112 and/or the second head 107 upon separating the second filter 112 from the second head 107 while the first filter 111 is mounted to the first head 106, may be guided to the first filter 111 along the first residual water guides 101bb and 103bb. The residual water falling into the first filter 111 may flow down the outer surface of the first filter 111 and then be collected in the residual water tray 140. Particularly, the residual water, which is generated from the second filter 112 in the process of separating the second filter 112, may be guided to the first filter 111 by the first residual water guides 101bb and 103bb, and then flow down to the residual water tray 140. In addition, residual water generated from the second head 107 may be guided to the first filter 111 by the first guide inclined portion 109a and then flow down to the residual water tray 140. That is, the water supply assembly 100 according to an embodiment of the disclosure may effectively collect residual water, which is generated upon separating the second filter 112 while the first filter 111 is not separated, to the residual water tray 140.

For convenience of description, the case in which the second filter 112 is separated from the second head 107, has been described, but in a case in which the third filter 113 is separated from the third head 108, it is possible to effectively collect residual water, which is generated from the third filter 113 and the third head 108, to the residual water tray 140 through the above mentioned operation.

Figure 10:
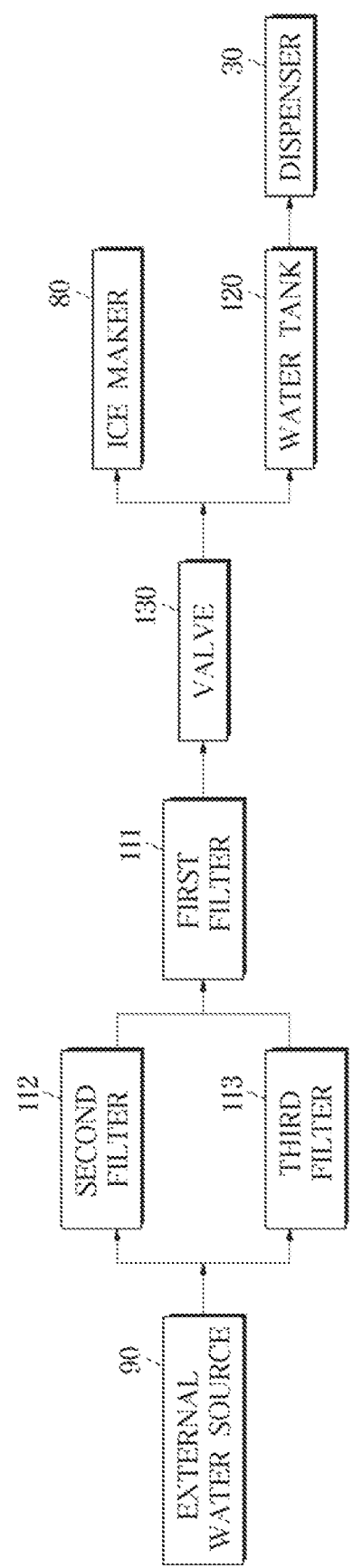
FIG. 10 is a diagram schematically illustrating a water supply line of the water supply assembly show in FIG. 2.

FIG. 10 is a diagram schematically illustrating a water supply line of the water supply assembly show in FIG. 2.

A water supply line of the refrigerator 1 according to an embodiment of the disclosure will be described with reference to FIG. 10. First, water supplied from the external water supply source 90 may be supplied to the second filter 112 and the third filter 113 in parallel. Water purified by the second filter 112 and the third filter 113 may be supplied to the first filter 111.

In a conventional manner, as the water supplied from the external water supply source 90 sequentially passes through a plurality of filters, a flow rate may be lost. That is, in the conventional manner, all of the plurality of filters is connected in series. However, in the water supply assembly 100 of the refrigerator 1 according to an embodiment of the disclosure, the water supplied from the external water supply source 90 may be simultaneously supplied to the second filter 112 and the third filter 113, and then delivered to the first filter 111. Therefore, it is possible to minimize the loss of flow rate. That is, in the water supply assembly 100 of the refrigerator 1 according to an embodiment of the disclosure, the second filter 112 and the third filter 113 may be connected in parallel.

Thereafter, the water purified by the first filter 111 may be delivered to the valve 130. Part of the water delivered to the valve 130 may be supplied to the ice maker 80, and the remaining part may be delivered to the water tank 120. Water stored in the water tank 120 may be supplied to the dispenser 70 as needed. Water supplied to the dispenser 70 may be pre-cooled in the water tank 120.

Figure 11:
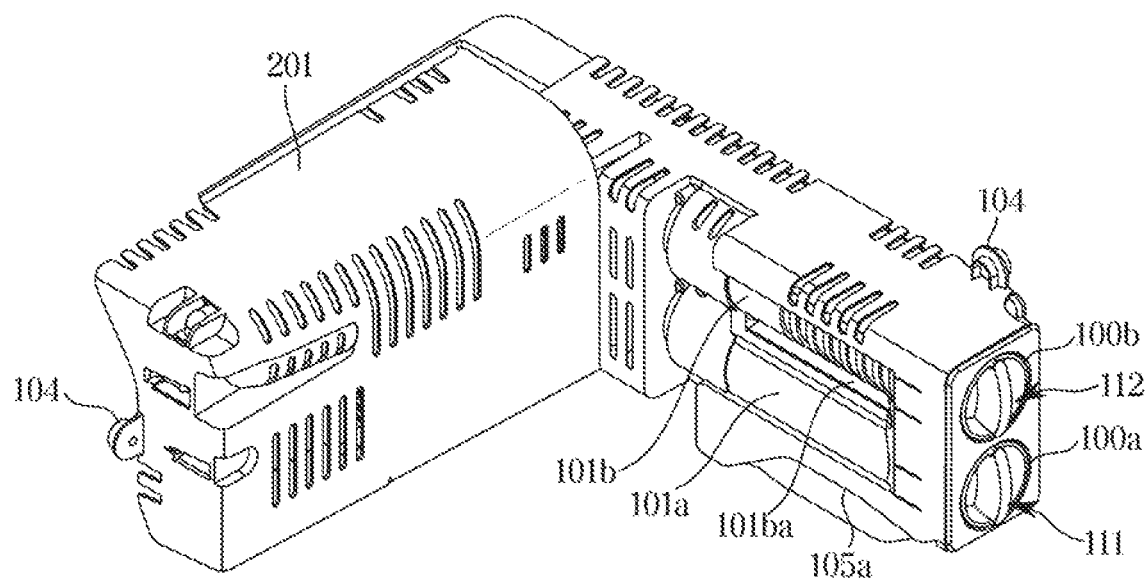
FIG. 11 is a view illustrating a water supply assembly according to another embodiment of the disclosure.

FIG. 11 is a view illustrating a water supply assembly according to another embodiment of the disclosure.

A water supply assembly 200 according to another embodiment of the disclosure will be described with reference to FIG. 11. However, the same reference numerals are assigned to the same components as those of the water supply assembly 100 according to the embodiment illustrated in FIGS. 2 to 10, and detailed descriptions may be omitted.

Referring to FIG. 11, in the water supply assembly 200, components related to the third filter 113 may be omitted in comparison with the water supply assembly 100 according to an embodiment illustrated in FIGS. 2 to 10. That is, while the water supply assembly 100 according to an embodiment shown in FIGS. 2 to 10 includes three filters 111, 112 and 113, the water supply assembly 200 according to another embodiment shown in FIG. 11 may include only two filters 111 and 112. The components related to the first filter 111 and the second filter 112 of the water supply assembly 200 according to another embodiment shown in FIG. 11 may be the same as components related to the first filter 111 and the second filter 112 of the water supply assembly 100 according to an embodiment shown in FIGS. 2 to 10, and thus detailed descriptions are omitted.

Accordingly, a case 201 of the water supply assembly 200 according to another embodiment shown in FIG. 11 may be reduced in size than the case 101 of the water supply assembly 100 according to an embodiment shown in FIGS. 2 to 10. Accordingly, the water supply assembly 200 according to another embodiment shown in FIG. 11 may be configured to be more compact than the water supply assembly 100 according to an embodiment shown in FIGS. 2 to 10, and thus it is possible to more effectively use the space of the storage compartment 20, 30, and 40.

As is apparent from the above description, the refrigerator may minimize the space occupied by the water supply system, thereby efficiently using the space in the storage compartment.

The refrigerator may include the residual water tray configured to collect water that may be generated upon replacing the filter, and thus it is possible facilitate maintenance and repair of the water supply system.

The refrigerator may be provided with a water drop guide provided in the filter mounting portion, and thus the refrigerator may effectively manage water that may be generated upon replacing the filter.

The refrigerator may supply water to the second and third filters in parallel, and the refrigerator may allow the water, which passes through the second and third filters, to pass through the first filter, thereby minimizing a decrease in the flow rate.

Although a few embodiments of the disclosure have been shown and described, it would be appreciated by those skilled in the art that changes may be made in these embodiments without departing from the principles and spirit of the disclosure, the scope of which is defined in the claims and their equivalents,

What is claimed is:

1. A refrigerator comprising:
   a main body comprising a storage compartment; and
   a water supply assembly disposed in the storage compartment,
   wherein the water supply assembly comprises
      a first filter mounting portion provided to allow a first filter to be mounted thereon, and
      a second filter mounting portion provided to allow a second filter to be mounted thereon, and comprising
         a residual water guide that extends from the second filter mounting portion toward the first filter mounting portion and is configured to guide residual water in the second filter mounting portion to the first filter mounting portion.

2. The refrigerator of claim 1, wherein the second filter mounting portion comprises a guide inclined portion formed to be inclined downward in a direction that the second filter is separable from the second filter mounting portion.

3. The refrigerator of claim 1, wherein
   the water supply assembly further comprises a head to which the second filter is coupleable while mounted on the second filter mounting portion, and from which the second filter is separable, and
   the residual water is generated from the second filter or the head upon the second filter being separated from the head.

4. The refrigerator of claim 1, wherein the water supply assembly further comprises a ventilation hole formed between the first filter mounting portion and the second filter mounting portion.

5. The refrigerator of claim 4, wherein the ventilation hole extends along a direction in which the second filter is separable from the second filter mounting portion.

6. The refrigerator of claim 1, further comprising:
   a storage box disposed inside the main body,
   wherein the water supply assembly is formed to extend along one side and a rear side of the storage box.

7. The refrigerator of claim 6, wherein the water supply assembly is configured to allow a portion of the first filter and a portion of the second filter to be exposed from the storage box when the storage compartment is opened.

8. The refrigerator of claim 1, wherein the water supply assembly further comprises:
   a residual water tray disposed under the first filter mounting portion.

9. The refrigerator of claim 8, wherein
   the water supply assembly further comprises a first filter separating portion through which the first filter is passable to be mounted on the first filter mounting portion and, after being mounted on the first filter mounting portion, is passable to be separated from the water supply assembly, and
   the residual water tray is configured to be withdrawn from the water supply assembly through the first filter separating portion.

10. The refrigerator of claim 8, wherein the residual water tray is mountable in the water supply assembly, and the water supply assembly further comprises:
    a tray guide configured to guide a movement of the residual water tray while the residual water tray is being mounted in the water supply assembly.

11. The refrigerator of claim 1, wherein
    the residual water guide is a first residual water guide, and
    the water supply assembly further comprises a third filter mounting portion provided to allow a third filter to be mounted thereon, located above the second filter mounting portion, and comprising a second residual water guide configured to guide residual water in the third filter mounting portion to the second filter mounting portion.

12. The refrigerator of claim 11, wherein the water supply assembly is configured to guide water supplied from a water supply source to the second filter and the third filter in parallel, and configured to guide water, which passes through the second filter and the third filter, to the first filter.

13. The refrigerator of claim 12, wherein
the refrigerator further comprises an ice maker, and
the water supply assembly further comprises:
- a water tank, and
- a valve configured to distribute water, which passes through the first filter, to the water tank or the ice maker.

14. The refrigerator of claim 13, wherein the water tank comprises:
- a water tank inlet connected to the valve,
- a water tank outlet configured to discharge water that flows from the water tank inlet, and
- a water tank pipe connected to the water tank inlet and provided to extend toward a side opposite to a side on which the water tank outlet is disposed.

15. The refrigerator of claim 13, wherein
the first filter mounting portion and the second filter mounting portion are configured so that, when the first filter is mounted on the first filter mounting portion and the second filter is mounted on the second filter mounting portion, the first filter and the second filter longitudinally extend in a same direction, and
the water tank is provided to extend in a direction perpendicular to the direction in which the first filter and the second filter longitudinally extend.

* * * * *